(12) United States Patent
Buff

(10) Patent No.: US 7,441,810 B2
(45) Date of Patent: Oct. 28, 2008

(54) RECREATION VEHICLE WASTE PIPE SEALING UNIT

(76) Inventor: Samuel Wayne Buff, P.O. Box 602, Marion, NC (US) 08752

( * ) Notice: Subject to any disclaimer, the term of this patent is extended or adjusted under 35 U.S.C. 154(b) by 396 days.

(21) Appl. No.: 11/220,503

(22) Filed: Sep. 7, 2005

(65) Prior Publication Data

US 2007/0052235 A1  Mar. 8, 2007

(51) Int. Cl.
  *F16L 17/00* (2006.01)
(52) U.S. Cl. .................. 285/346; 285/338; 285/107; 285/196; 285/217; 29/454
(58) Field of Classification Search ............... 285/107, 285/109, 196, 214, 213, 216, 217, 375, 338, 285/346; 29/454
  See application file for complete search history.

(56) References Cited

U.S. PATENT DOCUMENTS

| 402,600 | A | * | 5/1889 | Kemp .................... 285/338 |
| 2,744,559 | A | * | 5/1956 | Leonetti ................ 285/196 |
| 3,048,428 | A | * | 8/1962 | Ransom ................. 285/338 |
| 3,623,752 | A | | 11/1971 | Brown |
| 3,850,210 | A | * | 11/1974 | Buxton .................. 285/338 |
| 4,240,473 | A | * | 12/1980 | Leonard ................ 285/338 |
| 4,688,833 | A | | 8/1987 | Todd |
| 4,722,556 | A | | 2/1988 | Todd |
| 4,740,019 | A | | 4/1988 | Casimir et al. |
| 4,758,027 | A | | 7/1988 | Todd |
| 5,143,381 | A | | 9/1992 | Temple |
| 5,211,428 | A | | 5/1993 | Emerson et al. |
| 5,224,516 | A | * | 7/1993 | McGovern et al. ........... 138/97 |
| 5,401,061 | A | * | 3/1995 | Yamashita ................. 285/338 |
| 5,437,482 | A | | 8/1995 | Curtis |
| 5,509,699 | A | | 4/1996 | Himmelberger |
| D375,786 | S | | 11/1996 | Morris |
| 5,687,998 | A | * | 11/1997 | Pan ......................... 285/338 |
| 5,695,222 | A | * | 12/1997 | Hodges .................... 285/328 |
| 5,992,896 | A | | 11/1999 | Davey et al. |
| 6,237,965 | B1 | | 5/2001 | Kuo |

* cited by examiner

*Primary Examiner*—David E Bochna
(74) *Attorney, Agent, or Firm*—Davis Bujold & Daniels, P.L.L.C.

(57) ABSTRACT

A sewer line coupling device to facilitate attachment of a recreational vehicle sewer line to a fixed waste pipe. The coupling device comprising a main body having a second end for insertion into the waste pipe. A movable member is movable relative to the main body and a sealing sleeve is supported by the main body adjacent the second end. One end of the sealing sleeve is affixed to the main body while the other end is coupled to the movable member. When the movable member is moved in a first direction, a minimum dimension of the sealing sleeve is achieved to facilitate insertion into the waste pipe and, when the movable member is moved in an opposite direction, a maximum dimension of the sealing sleeve is achieved to facilitate formation of a seal with the waste pipe. A flange is supported by the main body between the first end and the second end thereof.

19 Claims, 15 Drawing Sheets

RECREATION VEHICLE WASTE PIPE SEALING UNIT

FIELD OF THE INVENTION

The present invention relates to a releasable coupling device for sealingly engaging with a fixed waste pipe at an RV camping and/or recreation area.

BACKGROUND OF THE INVENTION

Travel in a recreational vehicle (RV) has become quite popular in recent years. This form of travel allows a traveler (s) to enjoy the amenities of their own home while out on the road traveling and visiting different areas or regions. Some of the comforts provided by an RV includes a bed(s), a bathroom (s), a kitchenette(s) as well as a variety of other personal amenities. Waste from the bathroom toilet(s) and/or shower (s) and the sink(s) of the bathroom and/or kitchenette are typically collected in an internal a sewage holding tank of the RV which must be periodically emptied.

RV camping and/or recreation areas generally provide a fixed waste pipe located within the ground at each site of the RV camping and/or recreation areas. This fixed waste pipe permits each RV to attach a flexible RV sewer line to the fixed waste pipe and allow the traveler to operate the shower, toilet and sinks and directly dispose of such waste without unnecessary filling the RV's sewage holding tank.

One problem with this arrangement, however, is that different RV camping and/or recreation areas often have different types and/or sizes of fixed waste pipes. As a result of such variation in the fixed waste pipes from camp site to camp site, often times the flexible sewer line from the RV does not tightly engage with the fixed waste pipe at certain RV camping and/or recreation areas. If the flexible sewer line does not engage with the fixed waste pipe in a sufficiently tight fashion, noxious gases and fumes may constantly escape from the fixed waste pipe past the flexible RV sewer line. This creates an unpleasant odorous situation for the traveler(s).

There are many recreation vehicle sewer line adapters on the market today which are somewhat effective in combating this problem. However, such sewer line adapters often require much assembly and include a multitude of different parts in order to connect the flexible RV sewer line to the fixed waste pipe at the RV camping and/or recreation area.

In addition, when a camping site at an RV camping and/or recreation areas is not occupied, it is desirable to adequately cap or cover the fixed waste pipe of each such unoccupied camp site during the entire period of time that the site remains unoccupied. Such capping or covering blocks or prevents the escape of noxious gases and fumes therefrom. Prior art plugs or caps, used to close such open waste pipes, have met with limited success also because of the various different types and sizes of the fixed waste pipes which the prior art plugs or caps must properly engage.

SUMMARY OF THE INVENTION

Wherefore, it is an object of the present invention to overcome the above mentioned shortcomings and drawbacks associated with the prior art sewer line adapters and caps or covers.

It is an object of the invention to manufacture a simple easy to use coupling device which readily attaches to the flexible RV sewer line such that a sealing mechanism of the coupling device always properly engages the fixed waste pipe, regardless of variations in the type and/or size of the pipes from site to sites, and form a proper seal therewith.

Another object of the invention is to provide a sewer line connection which easily provides a tight seal between the flexible RV sewer line and the coupling device to prevent the escape of noxious gases and fumes thereby.

It is a further object of the invention to manufacture a simple easy to use cap or cover coupling device which readily attaches to the flexible RV sewer line such that a sealing mechanism of the coupling device always properly engages the fixed waste pipe, regardless of variations in the type and/or size of the pipes from site to site, and forms a proper seal therewith.

Still another object of the invention to provide a sealing mechanism which is normally biased into a maximum dimension sealing position, to automatically form a proper seal with the inwardly facing surface of the fixed waste pipe, while allowing the sealing mechanism to be quickly and easily altered to a minimum dimension sealing position to facilitate insertion and removal of the coupling device from the fixed waste pipe.

A waste pipe sealing unit comprises a main body having a fixed flange, a movable member and a flexible sealing sleeve and wire tie or hose clamps. The main body is generally cylindrical in shape with either a through bore extending the length of the main body or an end cap at a first end thereof, depending on the use of the sealing unit. The flange is fixed adjacent the first end of the main body. A first end of the flexible sealing sleeve is attached to the movable member while a second end of the flexible sealing sleeve is attached to a second end of the main body. When the sealing unit is inserted into a fixed waste pipe, the movable member is slid along the length of the main body towards the flange. The flexible sealing sleeve elongates, creating a small diameter as compared to its diameter in a natural state. Once the sealing unit is inserted into the fixed waste pipe, the flange is pulled in a direction out of fixed waste pipe while the movable member is securely hold inside the fixed waste pipe until resistance builds up creating a tight seal.

In one embodiment, the sealing unit is constitutes an RV sewer line adaptor for fixing and sealing an RV sewer line to a fixed waste pipe. In this embodiment the main body is generally a through bore. An exterior of the first end of the through bore main body comprises threaded section for engagement with an interior portion of a flexible RV sewer line. Alternatively, an interior of the first end of the through bore main body comprises a recess for mating with standard pipe adaptors. When the main body of the sealing unit, with the attached RV sewer line, is inserted into the fixed waste pipe in same manner as cited above, a tight seal is created between the fixed waste pipe and the flexible sealing sleeve thus creating a tight seal between the flexible RV sewer line and the fixed waste pipe.

In another embodiment, the sealing unit constitutes a fixed waste pipe plug. In this embodiment the first end of the main body of the sealing unit is closed. When the main body of the sealing unit is inserted into the fixed waste pipe in same manner as cited above, a tight seal is created between the fixed waste pipe and the flexible sealing sleeve thus capping or plugging the waste pipe.

The present invention relates to a coupling device, for engaging with a waste pipe, comprising: a main body having a second end for insertion into an opening of the waste pipe; a movable member movable relative to the main body; a sealing sleeve supported by the main body adjacent the second end, a second end of the sealing sleeve being affixed to the main body while a first end of the sealing sleeve being coupled to the movable member; whereby when the movable member is moved in a first direction, a minimum dimension of the sealing sleeve is achieved to facilitate insertion of the second end of the main body into the waste pipe and, when the movable member is moved in an opposite second direction, a maximum dimension of the sealing sleeve is achieved to facilitate formation of a seal with an inner surface of the waste pipe.

The present invention also relates to a coupling device, for engaging with a waste pipe, comprising: a main body having a second end for insertion into an opening of the waste pipe; a flange being supported by the main body between the first end and the second end of the main body; a movable member movable relative to the main body; and a sealing sleeve supported by the main body adjacent the second end, a second end of the sealing sleeve being affixed to the main body while a first end of the sealing sleeve being coupled to the movable member; whereby when the movable member is moved in a first direction, a minimum dimension of the sealing sleeve is achieved to facilitate insertion of the second end of the main body into the waste pipe and, when the movable member is moved in an opposite second direction, a maximum dimension of the sealing sleeve is achieved to facilitate formation of a seal with an inner surface of the waste pipe; and the movable member has a collar and the first end of the sealing sleeve is secured to the collar.

The present invention further relates to a method of engaging a coupling device to a waste pipe, the method comprising the steps of: forming a main body with a second end which is sized for insertion into an opening of the waste pipe; allowing a movable member movable to move relative to the main body; supporting a sealing sleeve on the main body adjacent the second end; affixing a second end of the sealing sleeve to the main body and coupling a first end of the sealing sleeve to the movable member; and moving the movable member in a first direction to minimize a dimension of the sealing sleeve and facilitate insertion of the second end of the main body into the waste pipe; and moving the movable member in an opposite second direction so as maximize the dimension of the sealing sleeve and facilitate formation of a seal with an inner surface of the waste pipe.

BRIEF DESCRIPTION OF THE DRAWINGS

The waste pipe sealing unit will now be described, by way of example, with reference to the accompanying drawings in which.

DETAILED DESCRIPTION OF THE INVENTION

Figure 1:
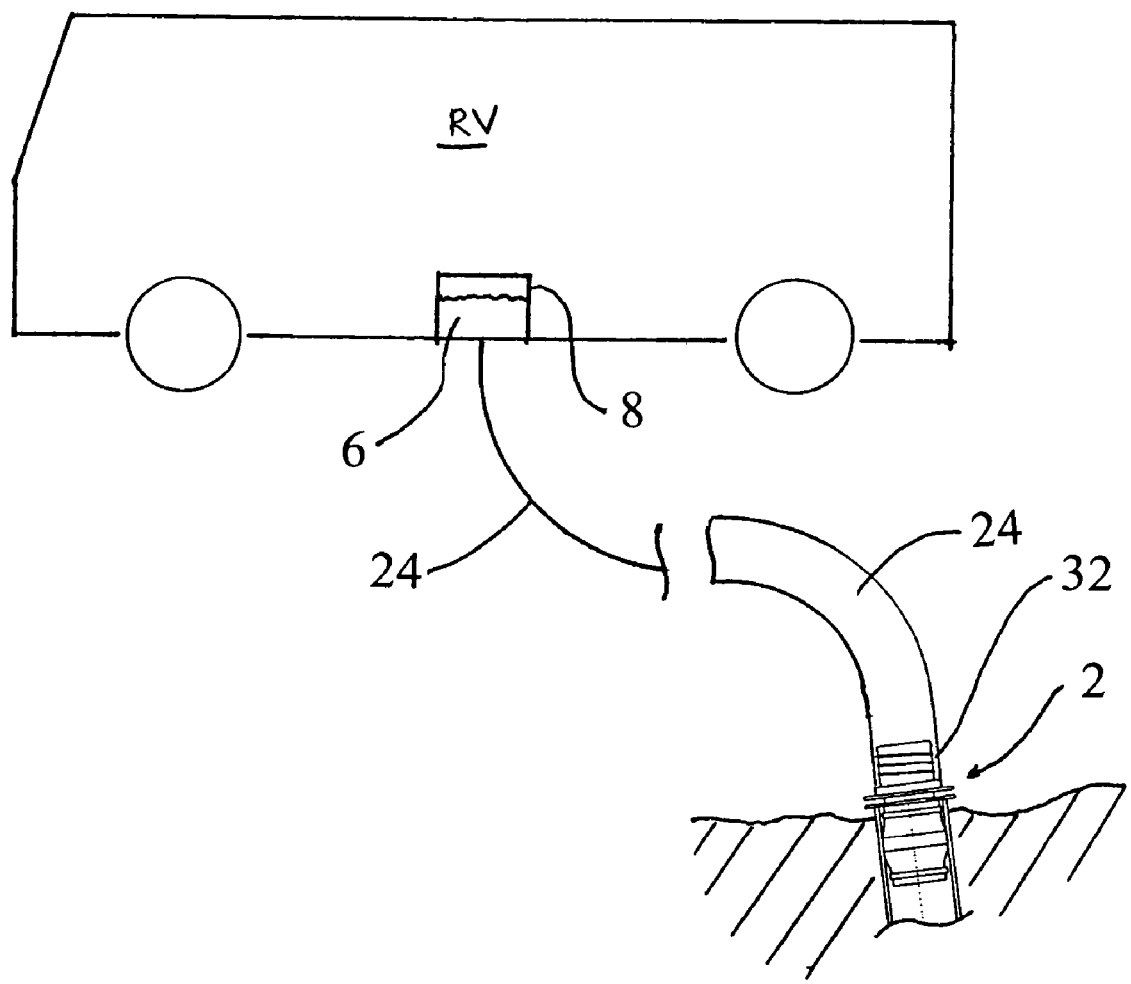
FIG. 1 is a diagrammatic view showing installation of the coupling device with a fixed waste pipe and direct connection of the coupling device with an RV sewer line, according to the present invention.
Figure 1A:
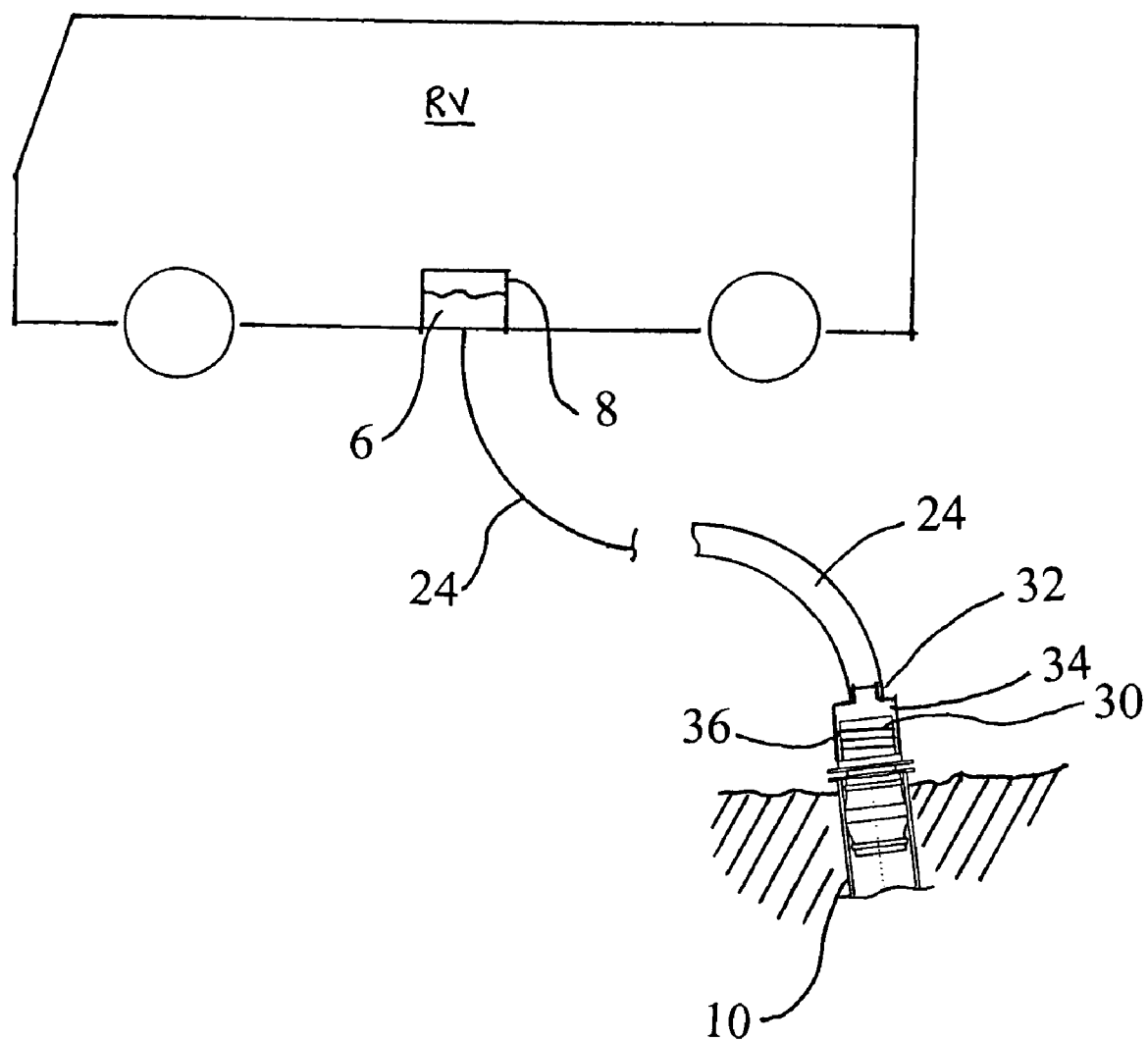
FIG. 1A is a diagrammatic view showing installation of the coupling device with a fixed waste pipe and connection of the coupling device to an RV sewer line via an adaptor.
Figure 2:
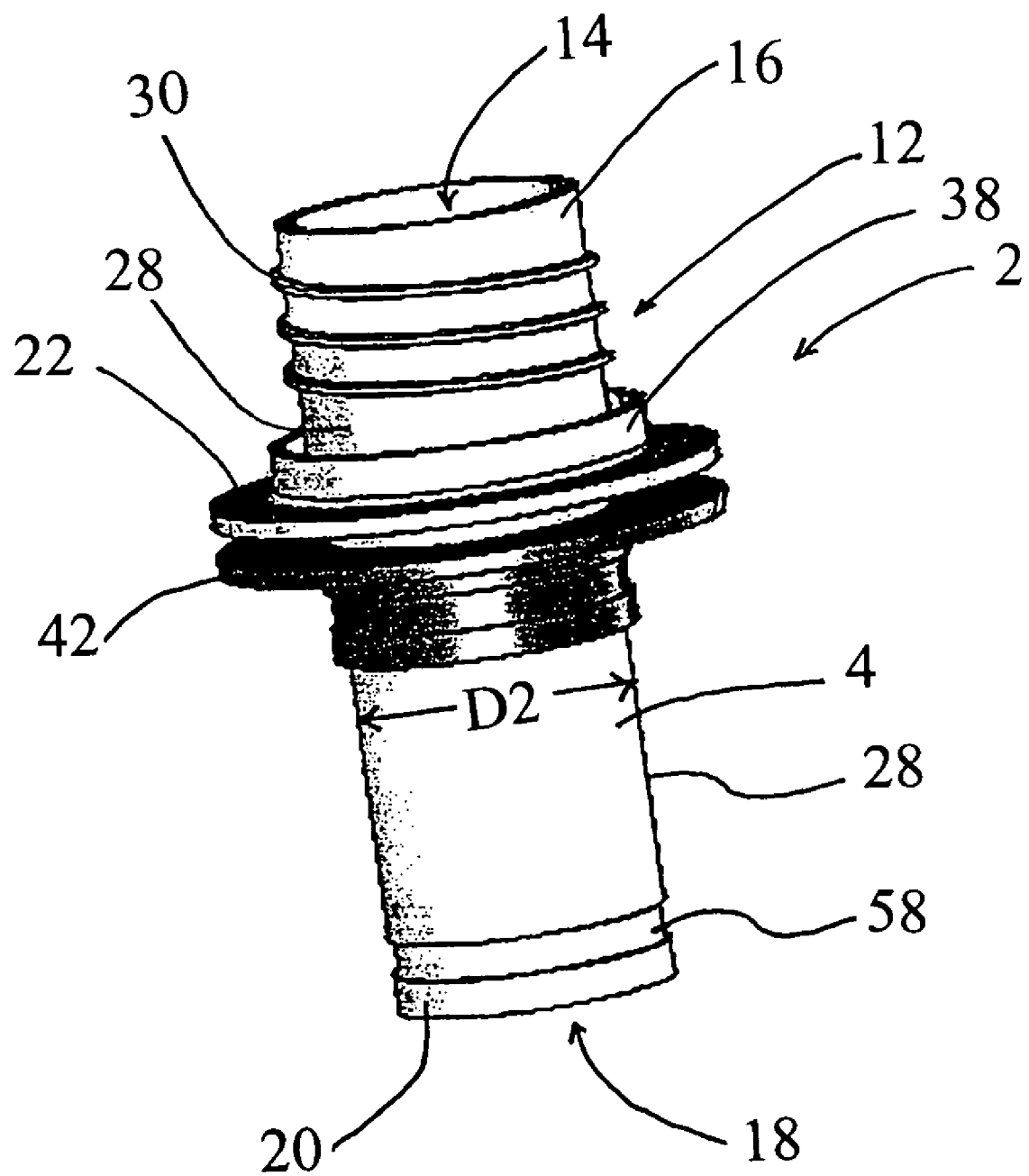
FIG. 2 is a diagrammatic perspective view of a main body of the sealing device supporting a movable member, according to the present invention.
Figure 2A:
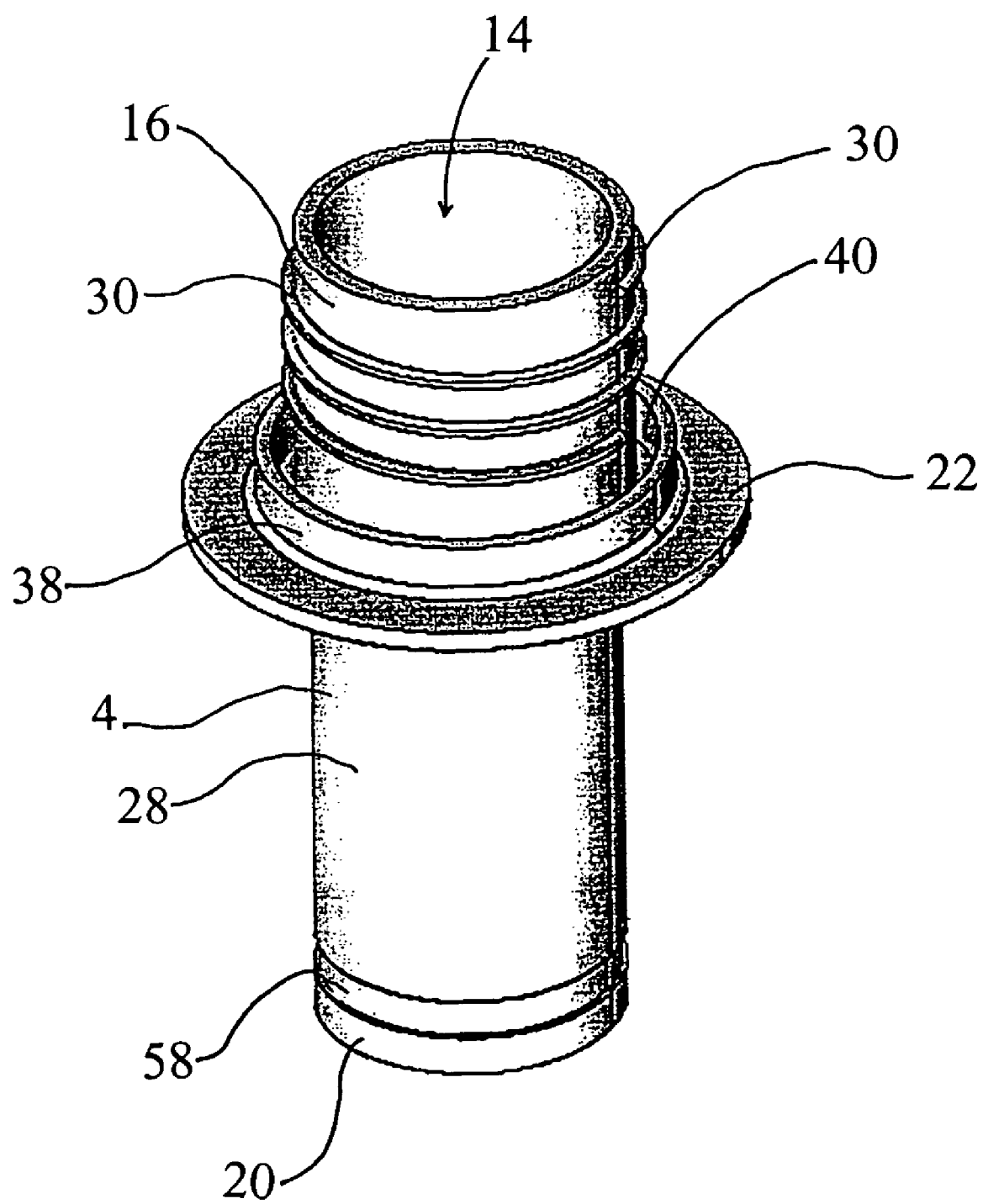
FIG. 2A is a diagrammatic perspective view of the main body of the sealing device.
Figure 3:
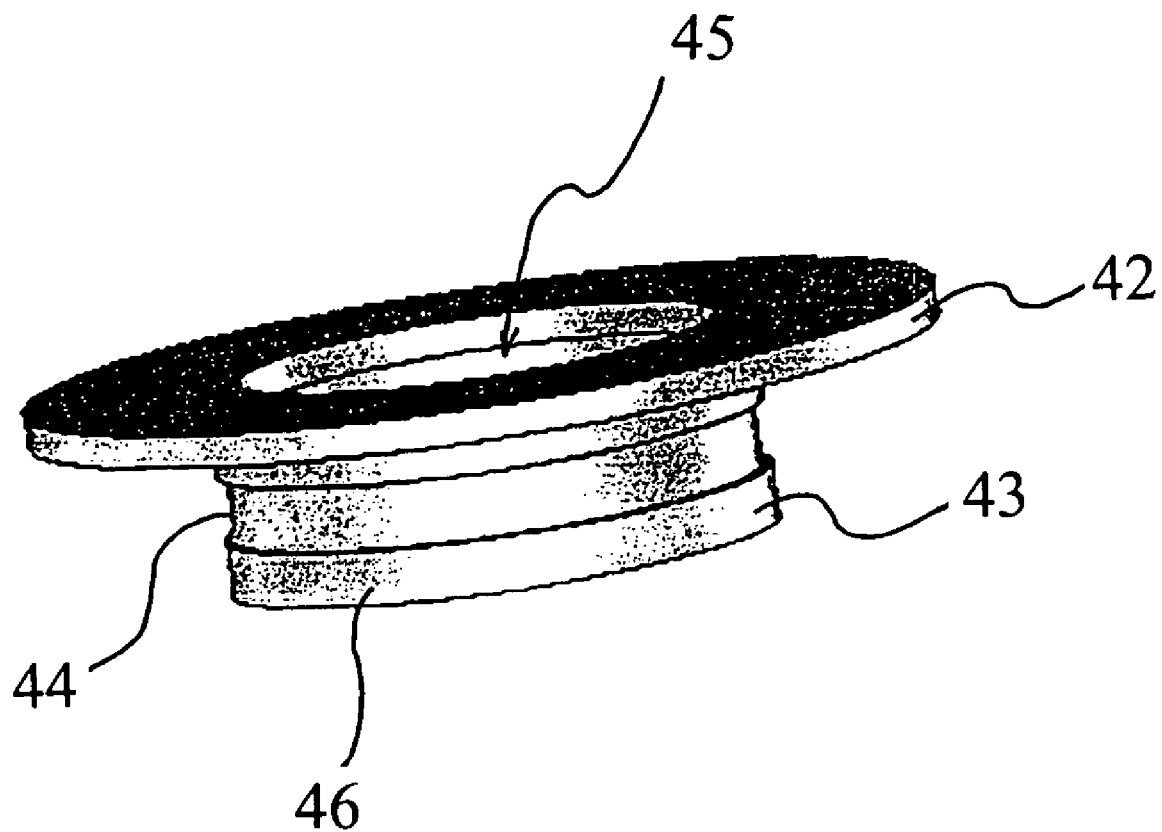
FIG. 3 is a diagrammatic perspective view of the movable member.

FIGS. 1-3 and 5-7 show the different components of a sewer line coupling device 2 according to a first embodiment of the present invention. The coupling device 2 generally comprises a main transfer member 4, which facilitates transfer of the waste 6 from the sewage holding tank 8 of an RV to the fixed waste pipe 10 installed in the ground, and a sealing mechanism 7, which facilitates forming a suitable seal between the coupling device 2 and the fixed waste pipe 10 when the coupling device 2 is engaged therewith. The main transfer member 4 generally comprises an elongate cylindrical main body 12 having an inlet 14 at a open first end 16 thereof and an outlet 18 at an opposed open second end 20 thereof. The main body 12 is hollow to permit the passage of the waste 6 from the sewage holding tank 8 along and through the main body 12 from the inlet 14 in the open first end 16 to the outlet 18 in the open second end 20 and into the fixed waste pipe 10.

A fixed flange 22 is permanently secured or affixed to the exterior surface 28 of the main body 12 in a conventional manner, e.g., by welding, soldering, molding, gluing, clamping, etc. Preferably the flange 22 is located somewhat closer to the first end 16 than to the second end 20 of the main body 12 although the exact location of the flange 22 can vary depending upon the application. As shown in the drawings, the flange 22 is generally a disk shaped member which extends substantially radially outward from and normal to a central longitudinal axis A of the main body 12. However, the overall shape and size of the flange 22 can vary from application to application. In addition, it is to be appreciated that the flange 22 may be formed integrally with the main body 12 so that the main body 12 and flange 22 form a single, unitary component.

The exterior diameter D2 of the main body 12 is smaller than the internal diameter D1 of preferably all conventional fixed waste pipes 10 so that the first end of the main body 12 can be readily received therein. The diameter of the flange 22 is preferably larger than the internal diameter D1 of all prior art fixed waste pipes 10 so that this flange forms a stop to prevent further insertion of the coupling device 2 into the fixed waste pipe 10. The main body 12 is typically a cylindrical pipe or conduit which has a length is between about 20 and 6 inches. The inner hollow bore through the main body 12 preferably has a diameter of between 6 and 2 inches so as to freely permit passage of the waste 6 from the sewage holding tank 8 therethrough while the outer diameter of the main body 12 is preferably between 7 and 3 inches. The flange 22 of the coupling device 2 preferably has a diameter of between about 8 and 4 inches.

The first end 16 of the main body 12 is sized to intimately and matingly engage with the interior surface of a conventional flexible RV sewer line 24 which extends from the RV and is connected with the sewage holding tank 8. To facilitate such engagement, the exterior surface 28 of the first end 16 of the main body 12 is provided with a coarse external thread 30 provided along the exterior surface 28 of the main body 12 generally from the first end of the main body 12 to a location adjacent the flange 22. The first end 16 of the main body 12 can either directly engage with a remote free end 32 of the flexible RV sewer line 24 or, alternatively, the remote free end 32 of the flexible RV sewer line 24 may be connected to an adaptor 34 which, in turn, engages with the coarse external thread 30 of the main body 12. The external thread 30 of the main body 12 facilitates a threaded engagement either directly with the inner surface of remote free end 32 of the flexible RV sewer line 24 or with a mating coarse internal threaded 36 carried by the adaptor 34 to releaseably secure the coupling device 2 to the remote free end 32 of the flexible RV sewer line 24. In order to connect the first end of the main body 12 with either directly to the remote free end 32 of the flexible RV sewer line 24 or to the adaptor 34, the first end of the main body 12 is inserted within the opening of the flexible RV sewer line 24 or the opening of the adaptor 34 and the main body 12 is rotated clockwise to threadingly attach the main body 12 to the flexible RV sewer line 24. When removal of the main body 12 from the flexible RV sewer line 24 is desired, the main body 12 is rotated in a counterclockwise direction relative to the flexible RV sewer line 24 to disengage the mating threads 30, 36.

A flange shoulder 38 extends axially from the flange 22 in a direction of the first end 16 of the main body 12. The flange shoulder 38, along with the main body 12 and the flange 22, form a recessed area 40. The recessed area 40 receives and accommodates a leading free end 32 of either the flexible RV sewer line 24 or a leading end of the adaptor 34 once the flexible RV sewer line 24 is completely threadingly engaged with the main body 12.

A movable or slidable flange or member 42 is located between the second end 20 of the main body 12 and the flange 22. The movable member 42 is sized to be freely movable or slidable along the exterior surface 28 of the main body 12 between the flange 22 and the second end 20 of the main body 12. To facilitate such sliding movement, the movable member 42 has a bore extending therethrough which is slightly larger in diameter than the exterior diameter of the main body 12, e.g., a few thousand of an inch to about an inch or so. The movable member 42 has an integral collar 43 which extends axially along the exterior surface 28 of the main body 12 toward the second end 20 of the main body 12. Similarly, the collar 43 has a bore 45 extending therethrough which is slightly larger in diameter than the exterior diameter of the main body 12, e.g., a few thousand of an inch to about an inch or so. As a result of this arrangement, both the movable member 42 and the collar 43 are integral with one another and movable together as a single component relative to the main body 12.

An outwardly facing annular channel or groove 44 is formed in an exterior surface 46 of the collar 43 and this annular channel or groove 44 facilitates clamping, coupling or otherwise securely connecting an opened first end 48 of a flexible sealing sleeve 50 (discussed below in further detail) thereto by an annular wire, a clamp, a hose clamp, or some other fastener 52. Similar to the flange 22, the movable member 42 preferably has a diameter which is larger than the diameter of all prior art fixed waste pipes 10 so that the movable member 42 forms a stop to limit or prevent further insertion of the coupling device 2 into the fixed waste pipe 10.

The sealing sleeve 50 is located between the movable member 42 and the second end 20 of the main body 12 for providing a seal between the coupling device 2 and the inwardly facing surface 51 of the fixed waste pipe 10. The sealing sleeve 50 is hollow and has opposed first and second opened ends 49, 54 such that the sealing sleeve 50 is able to encase and surround the exterior surface 28 of the main body 12. The sealing sleeve 50 is molded or formed so that, in its normal unbiased state, the sealing sleeve 50 generally has an relatively short axial length and maximum diameter configuration shown in FIG. 4. That is, the diameter of the sealing sleeve 50 in the central or intermediate region 56 thereof is much large than the diameter of the sealing sleeve 50 at either the opposed first or second opened ends 49 or 54 thereof. The diameter of the sealing sleeve 50, in its central or intermediate region 56, is also much large than the internal diameter D1 of the prior art fixed waste pipes 10 so as to facilitate formation of a releasable seal, e.g., a fluid tight seal, with an inwardly facing surface 51 of the fixed waste pipe 10 as will be discussed below in further detail.

The internal diameter of the second end 54 of the sealing sleeve 50 is generally slightly larger, e.g., by about an inch or so or less, than the exterior diameter of second end 20 of the main body 12 while the internal diameter of the first end 48 of the sealing sleeve 50 is generally slightly larger than the exterior diameter of the collar 43, e.g., by about an inch or so or less. An outwardly facing annular channel or groove 58 is formed in the exterior surface 28 of the main body 12 closely adjacent the second end 20 thereof. This annular channel or groove 58 in the main body 12 facilitates clamping, coupling or otherwise connecting the second end 54 of the sealing sleeve 50 to the main body 12 by an annular wire, a clamp, a hose clamp, or some other fastener 60. The annular channel or groove 58 prevents axial movement of the second end 20 of the sealing sleeve 50 relative to the main body 12. As noted above, the annular channel or groove 44 in the collar 43 facilitates clamping, coupling or otherwise connecting the first end 48 of the sealing sleeve 50 to the collar 43 by an annular wire, a clamp, a hose clamp, or some other fastener 52. The annular channel or groove 44 prevents axial movement of the first end 48 of the sealing sleeve 50 relative to the collar 43.

Figures 4, 4A:
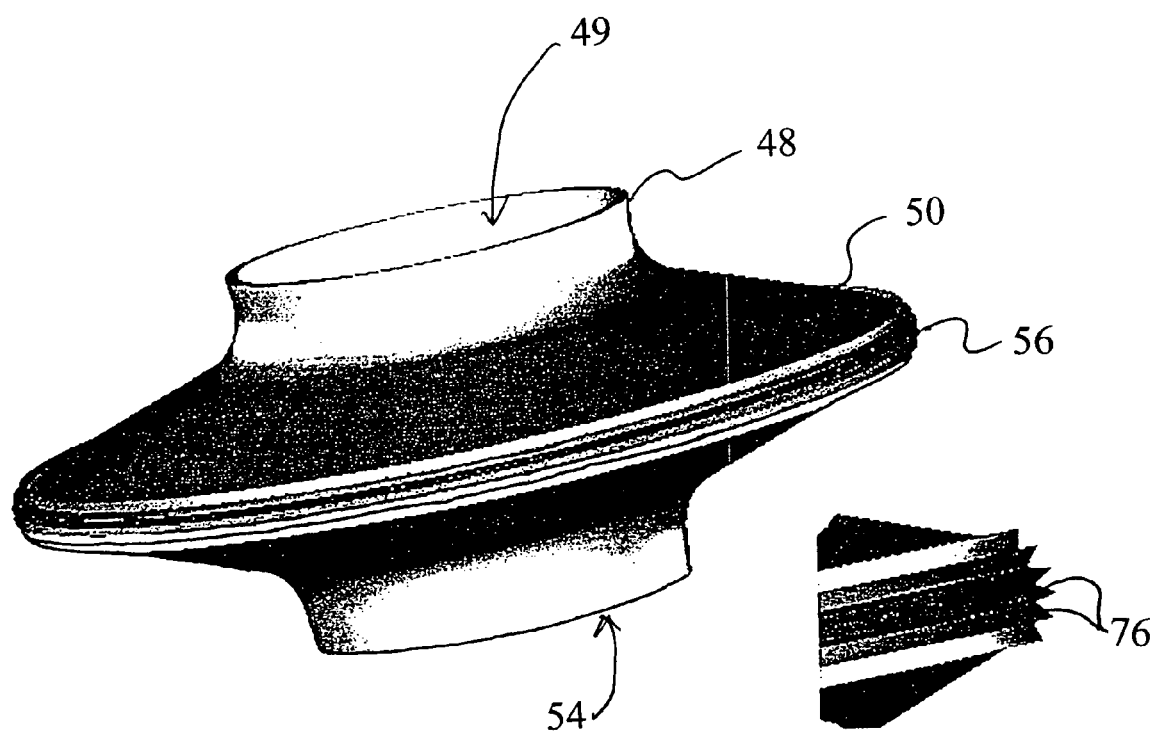
FIG. 4 is a diagrammatic view of a flexible sealing sleeve, in its normal unbiased relaxed state, having a plurality of annular ribs.
FIG. 4A is an exploded diagrammatic perspective view of the ribs of FIG. 4.

The sealing sleeve 50 is made of a flexible polymeric material that has the characteristic of being resistant to any changes in its normal physical shape as shown in FIG. 4. A preferred flexible polymeric material having such characteristics is rubber or TPE, for example. The thickness of the sealing sleeve 50 is substantially constant along its length and the thickness is between about 1/32 inches to about 5/16 inches.

Figure 5:
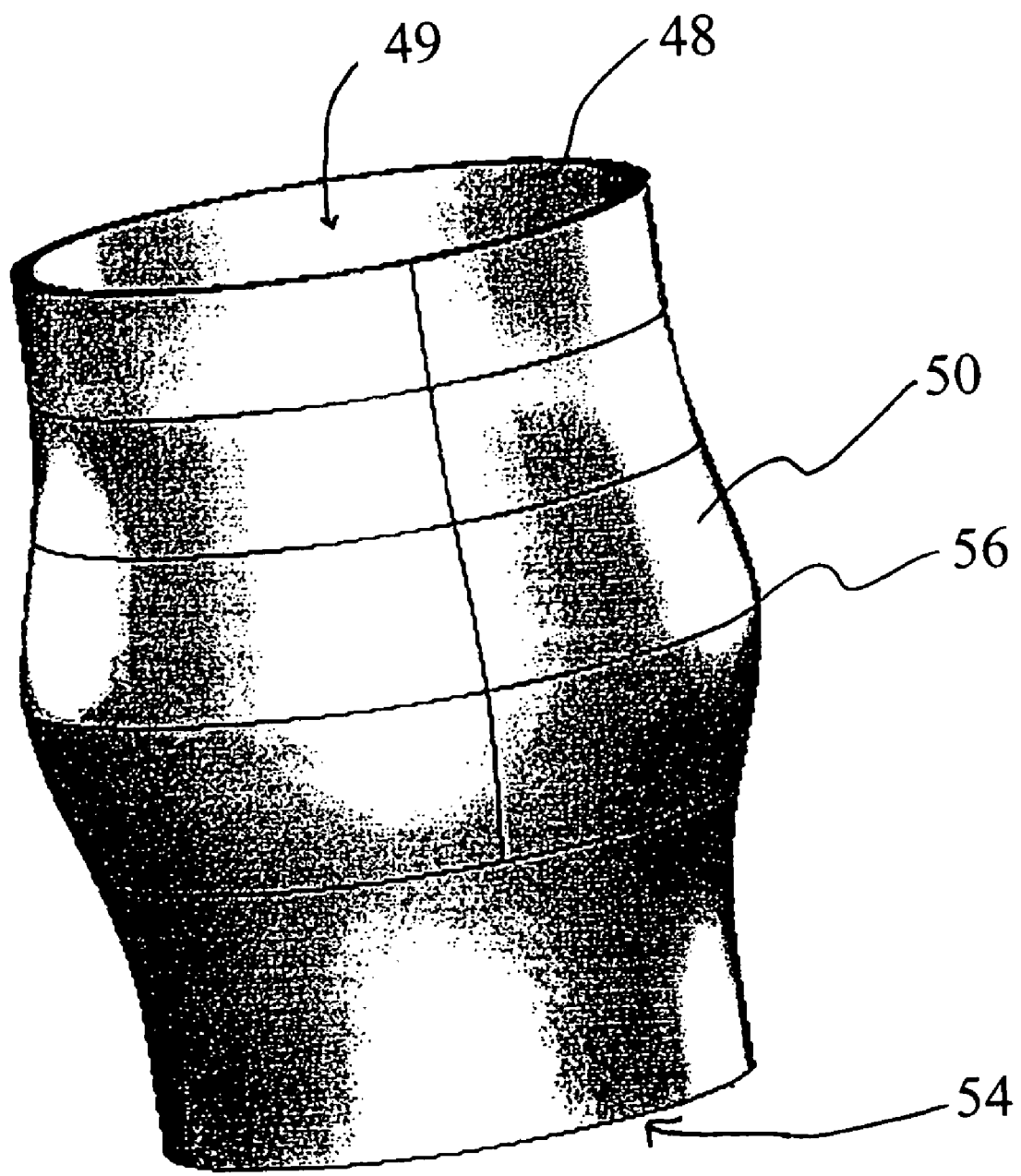
FIG. 5 is a diagrammatic view of a flexible sealing sleeve, without any ribs, in an elongate, stretched state.
Figure 6:
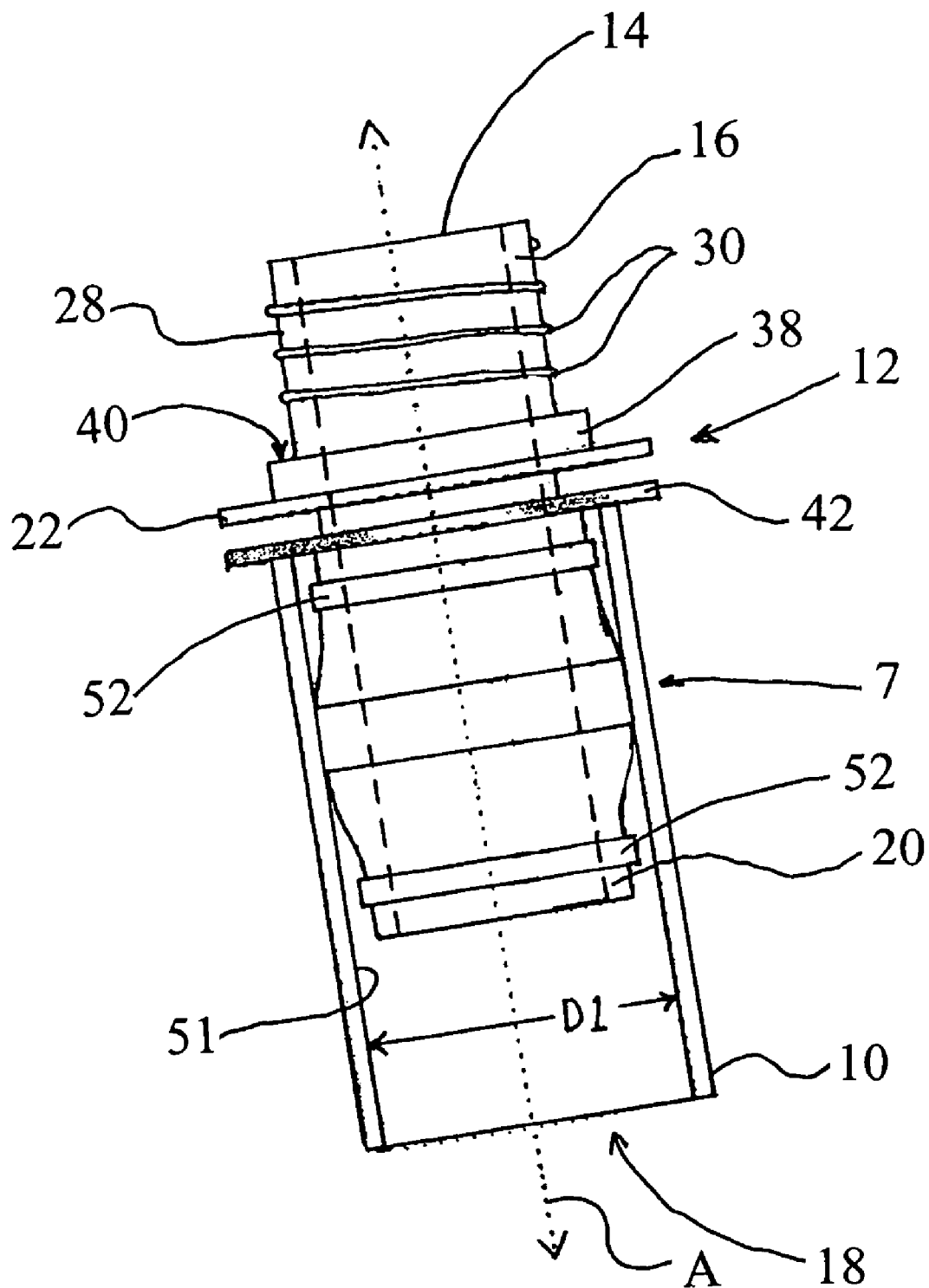
FIG. 6 is a diagrammatic front elevational cross sectional view of the coupling device showing installation within a fixed waste pipe.
Figure 6A:
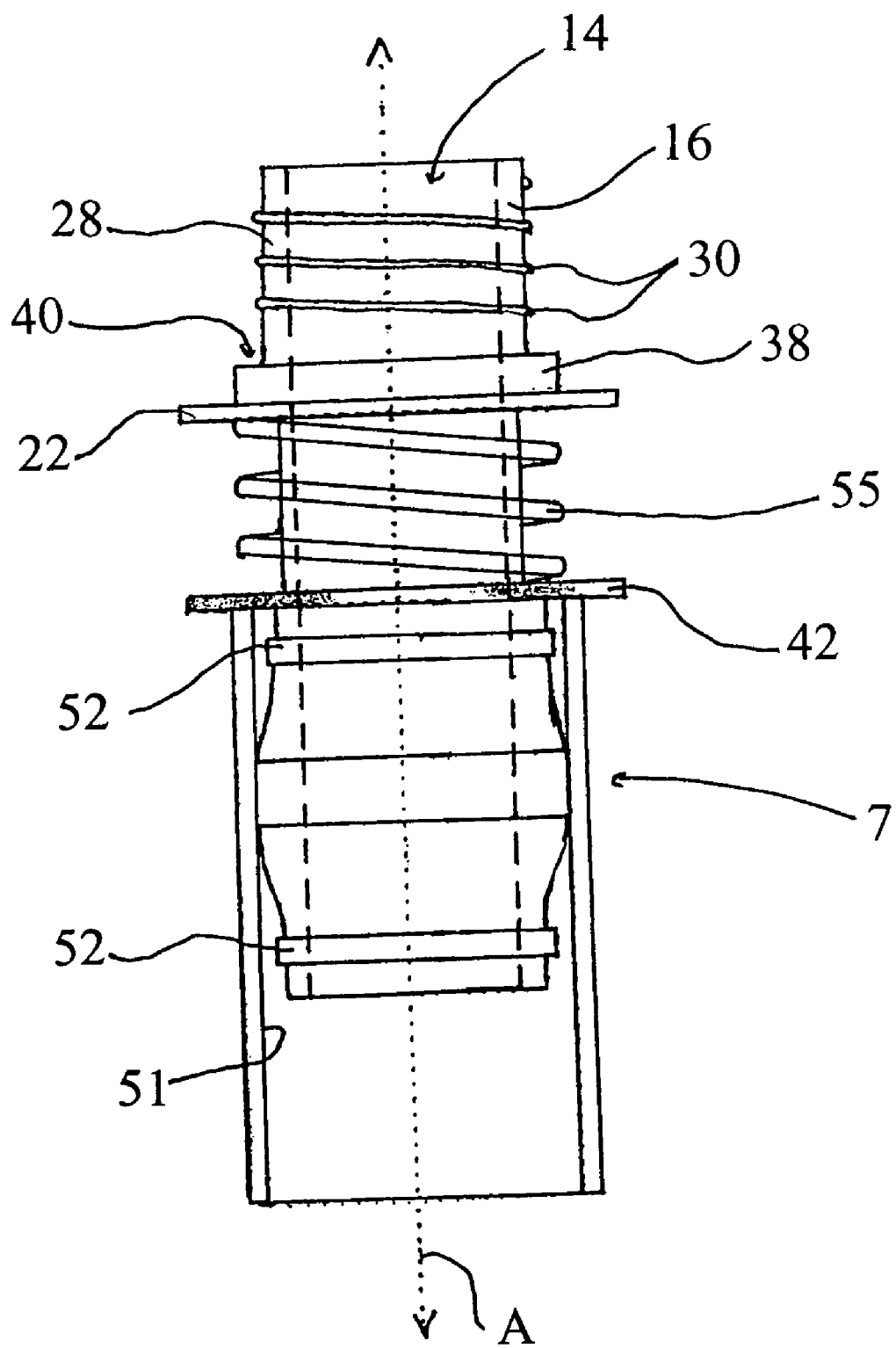
FIG. 6A is a diagrammatic front elevational cross sectional view of the coupling device with a single circumferential spring showing installation within a fixed waste pipe.
Figure 7:
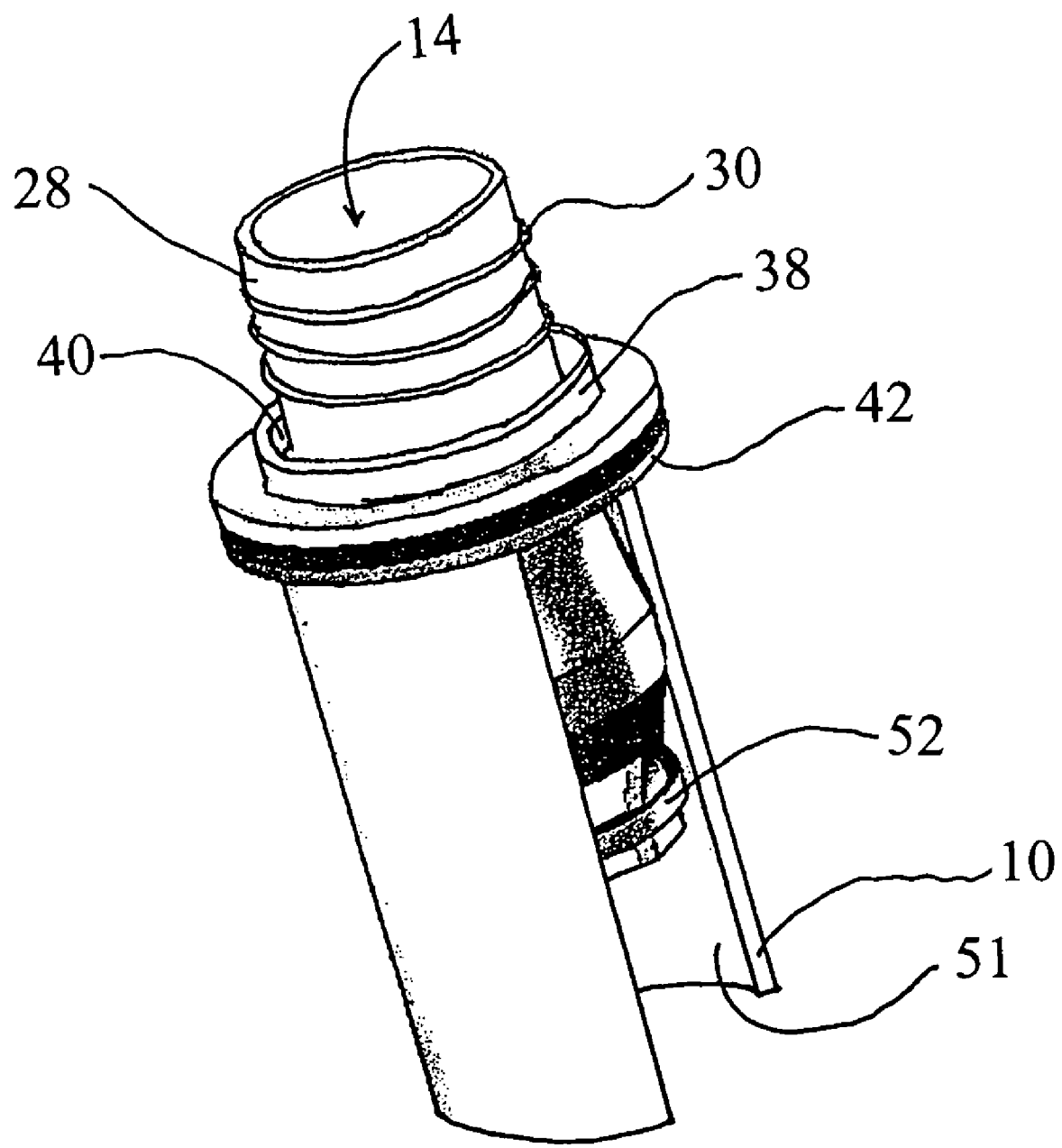
FIG. 7 is a diagrammatic perspective view, partially cut away, of the coupling device showing installation within a fixed waste pipe.
Figure 8:
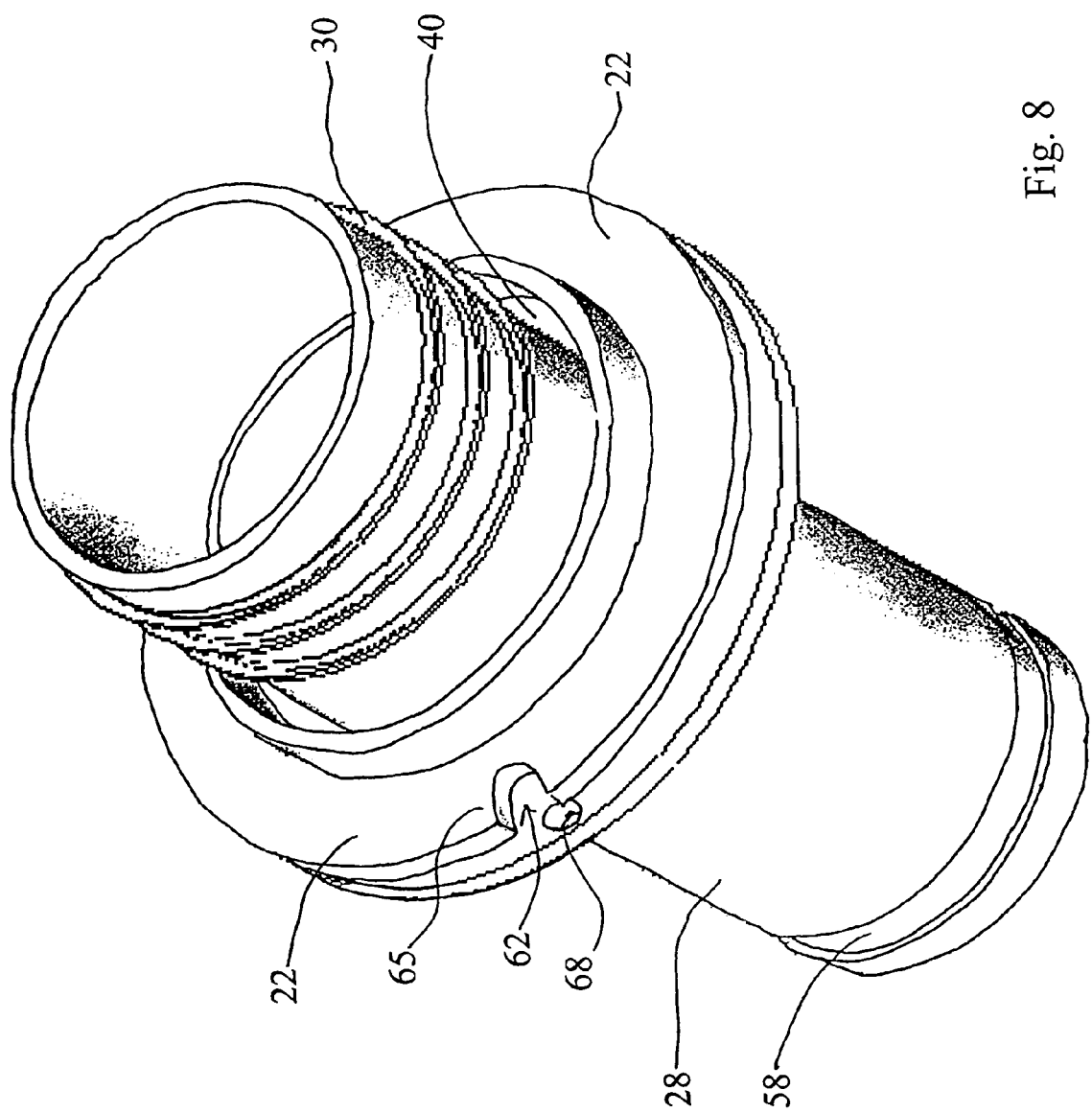
FIG. 8 is a diagrammatic perspective view of a second embodiment of the main body and the movable member of the sealing device facilitating use of a plurality of biasing units.
Figure 9:
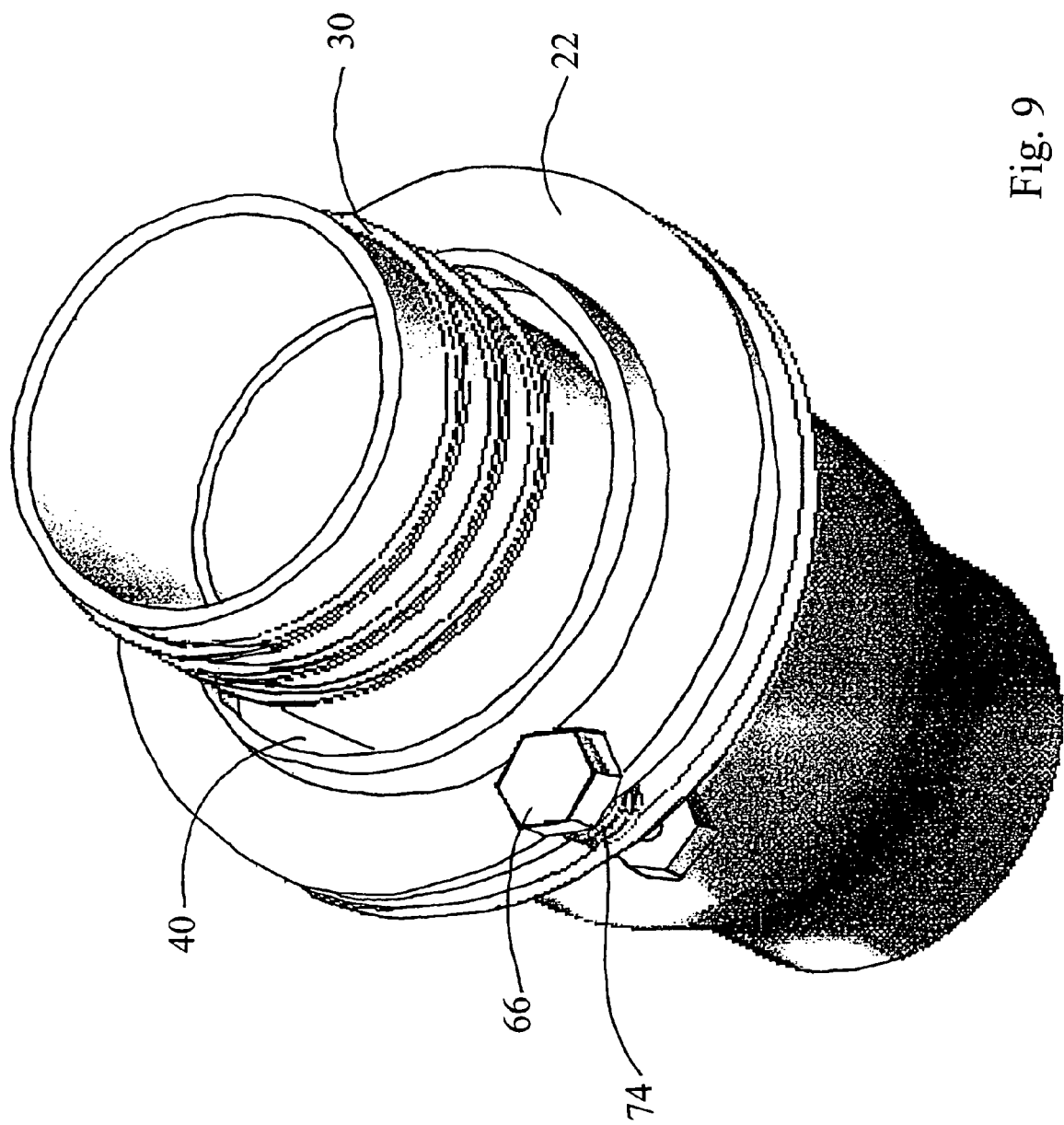
FIG. 9 is a diagrammatic perspective view of the main body and the movable member of FIG. 8 having a sealing sleeve and biasing units attached thereto.
Figure 10:
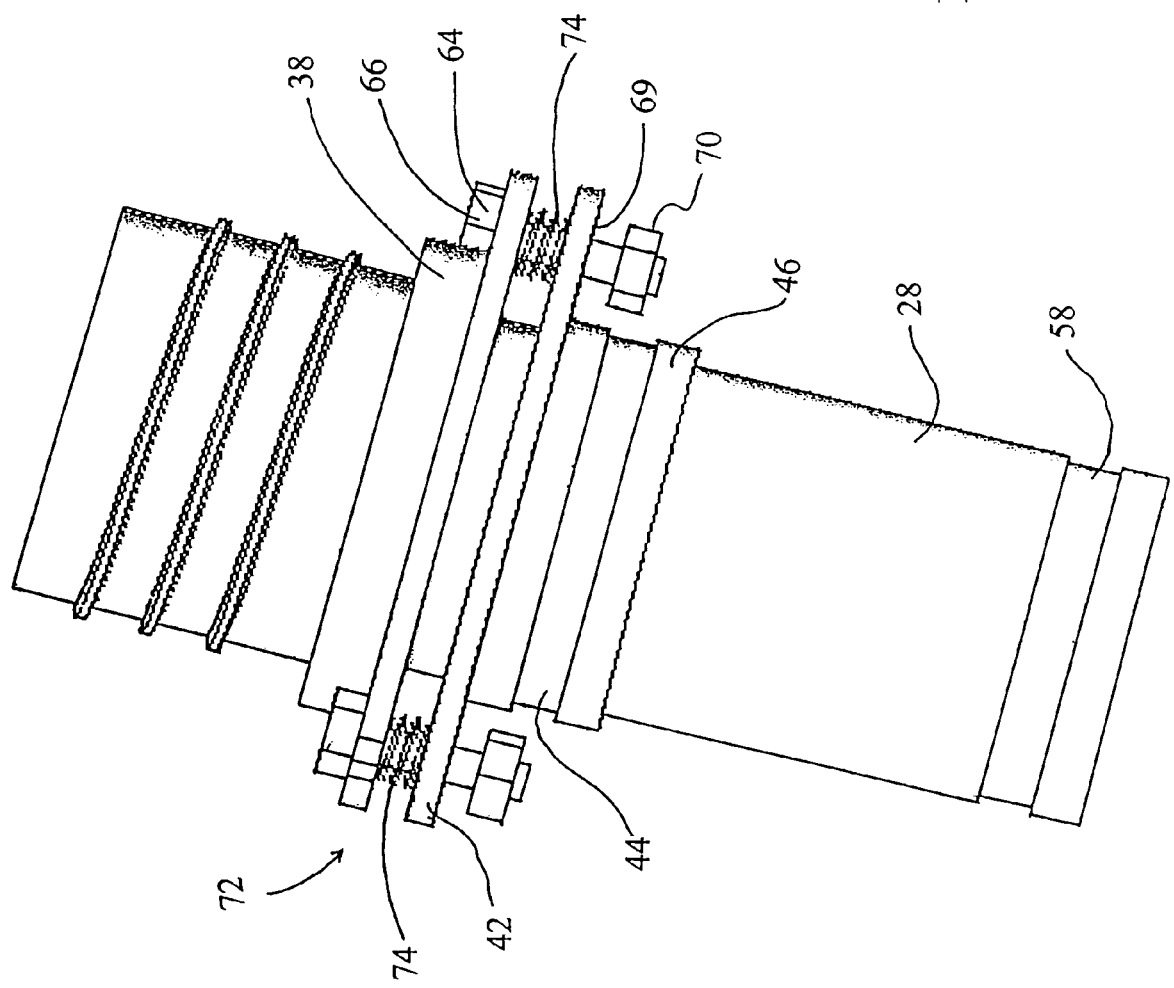
FIG. 10 is a diagrammatic front elevational view of the main body, the movable member and a pair of biasing units, similar to FIG. 9, prior to installation of the sealing sleeve.
Figure 11:
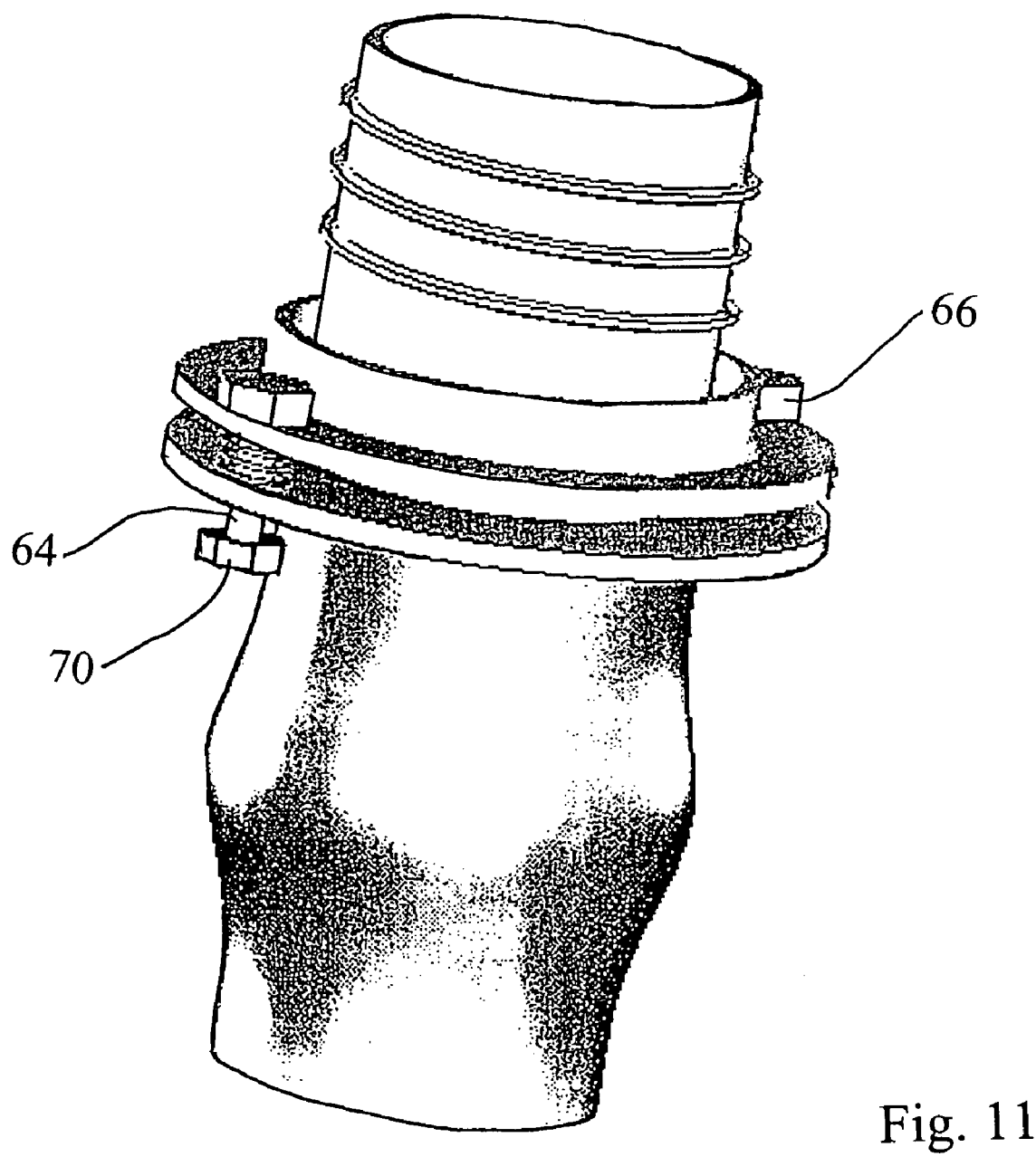
FIG. 11 is a diagrammatic perspective view of the main body, the movable member, and the pair of biasing units of FIG. 10 following installation of the sealing sleeve.

According to this embodiment, the sealing sleeve 50, when in its normal unbiased state, generally has a relatively short axial length but has a relatively large diameter intermediate region 56 as shown in FIG. 4. When the sealing sleeve 50 is biased or forced into a stretched or elongated configuration, by movement of the movable member 42, the sealing sleeve 50 adopts a more cylindrical shape, as shown in FIG. 5, but still has a tendency to return back to its normal unbiased state as soon as the biasing force of the movable member 42 is eliminated.

It is to be appreciated that the sealing sleeve 50 may be manufactured in opposite or reverse fashion without departing from the spirit and scope of the present invention. That is, the sealing sleeve 50, when in its normal unbiased state, generally has a cylindrical shape as shown in FIG. 5, i.e., a relatively long axially length and a relatively small dimensioned intermediate region 56. When the sealing sleeve 50 is biased or forced into a compressed configuration, by movement of the movable member 42 toward the second end 20 via one or more springs or biasing units, for example, the sealing sleeve 50 generally adopts a relatively short axially length and has a relatively large diameter intermediate region 56, as shown in FIG. 4, to facilitate achieving a seal with the inwardly facing surface 51 of the fixed waste pipe 10, as shown in FIG. 5, but still has a tendency to return back to its normal unbiased state as soon as the biasing force of the movable member 42 is eliminated.

The exterior surface 28 of the main body 12, between second end 20 and the flange 22 is generally a smooth and has constant diameter. The smooth, constant diameter exterior surface 28 of the main body 12 provides minimal friction, between the main body 12 and the movable member 42 and the sliding sleeve 50, as the movable member 42 moves to and fro along the main body 12, for forming a seal with the inwardly facing surface 51 of the fixed waste pipe 10 as described below in further detail.

As the movable member 42 slides along the longitudinal axis A of the main body 12 toward the flange 22, the movable member 42 may be brought into abutting engagement or contact with the flange 22. As a result of such abutting engagement, the flange 22 acts as a stop which prevents further sliding motion of the movable member 42 along the main body 12 away from the second end 20 of the main body 12. Such motion of the movable member 42 biases or forces the sealing sleeve 50 into a stretched or elongated shape, as shown in FIG. 5, thereby reducing the maximum diameter of the sealing sleeve 50 and facilitates insertion of the second end 20 of the coupling device 2 into a fixed waste pipe 10.

In order to maintain a desired spacing of the movable member 42 from the flange 22 and assist with formation of a seal between the exterior surface of the sliding sleeve 50 and the inwardly facing surface 51 of the fixed waste pipe 10, in FIG. 5A, a circumferential spring 55, having a diameter slightly larger than the main body 12 but smaller in diameter than both the movable member 42 and the flange 22, can be located between the movable member 42 away from the flange 22 to urge those components away from one another and assist the sealing sleeve 50 with returning back to is maximum dimension or diameter and thereby achieve an adequate fluid tight seal with the inwardly facing surface 51 of the fixed waste pipe 10. Alternatively, some other spacer member may be inserted between the movable member 42 and the flange 22 to maintain the desired spacing between those two components from one another and ensure that the seal between the sealing sleeve 50 and the inwardly facing surface 51 of the fixed waste pipe 10 is constantly maintained.

The flange 22 can either be a completely solid ring or disk, as depicted in the first embodiment of FIGS. 1, 2, 6, or 7, or the flange 22 can be provided with a plurality of peripheral notches 62 as depicted in the second embodiment of FIGS. 8-11 and 13. According to this second embodiment, two or more notches 62 (only two of which are shown in the drawings) are formed, cut, drilled or otherwise provided about the perimeter of the flange 22. Each notch 62 is sufficiently wide to accommodate the threaded section of a conventional bolt 64 while being small enough to provide a seating area 65 for the head 66 of the bolt 64. The bolt 64 is a component of a biasing apparatus which induces relative movement in one direction between the flange 22 and movable member 42 and a further discussion concerning the same will follow below. In addition, a corresponding number of apertures 68 (e.g., only two of which are shown in the drawings) are formed, cut, drilled or otherwise provided about the perimeter of the movable member 42. Each aperture 68 is sufficiently wide to accommodated the threaded section of the conventional bolt 64 while being small enough to provide a seating area 69 for an associated nut 70 which engages the threaded end of the bolt 64. During use, the apertures 68 of the movable member 42 align with the notches 62 of the flange 22 (see FIG. 8, for example).

Each biasing unit 72, in addition to the movable member 42 and the flange 22, also comprises the bolt 64, the nut 70 and a spring 74. The bolt 64 is first passed through the notch 62 in the flange 22 such that the bolt 64 engages with the seating area 65 of the flange 22. Next, the spring 74 is slid over the threaded section of the bolt 64 such that the spring 74 surrounds the threaded section of the bolt 64 and is located between the movable member 42 and the flange 22. Then, the movable member 42 is slid, along the main body 12, toward the flange 22 and rotated, as necessary, to a position in which each aperture 68 of the movable member 42 aligns with a threaded section of one of the bolts 64. As the movable member 42 is slid closer to the flange 22, the springs 74 may become slightly compressed and the leading threaded ends of the bolts 64 pass through the apertures 68 of the movable member 42. Once the leading threaded ends of the bolts 64 extend past the movable member 42, a respective nut 70 is threaded onto the leading threaded end of each bolt 64, in a conventional manner, to captive retain the movable member 42 in a spaced relationship from the flange 22. That is, the bolt and nut arrangement function as a stop and prevent the spacing of the movable member 42 from the flange 22 from exceeding a maximum distance while only permitting the spacing of movable member 42 from the flange 22 to decrease, i.e., the movable member 42 can only move closer to the flange 22. As will be appreciated, the length of the bolts 62 will determine the extend of travel of the movable member 42 relative to the flange 22 which is to be permitted by the biasing unit 72. Each bolt 64 preferably has a length of between about 6 inches to about 1 inch.

According to this embodiment, when an operator moves the movable member 42 closer to the flange 22, by compression of the springs, such motion stretches or elongates the sealing sleeve 50, from its normal unbiased state of FIG. 4, into a more generally cylindrical shape, as shown in FIG. 5, thereby reducing a maximum diameter of the sealing sleeve 50 and facilitate insertion of second end 20 of the coupling device 2 into a fixed waste pipe 10. When the force exerted on the movable member 42 is eliminated, the springs 70 bias the movable member 42 away from the flange 22 and such return motion of the movable member 42 assists the sealing sleeve 50 with returning back to its normal unbiased state of FIG. 4 and thereby forming a seal with the inwardly facing surface 51 of a fixed waste pipe 10.

Figure 12:
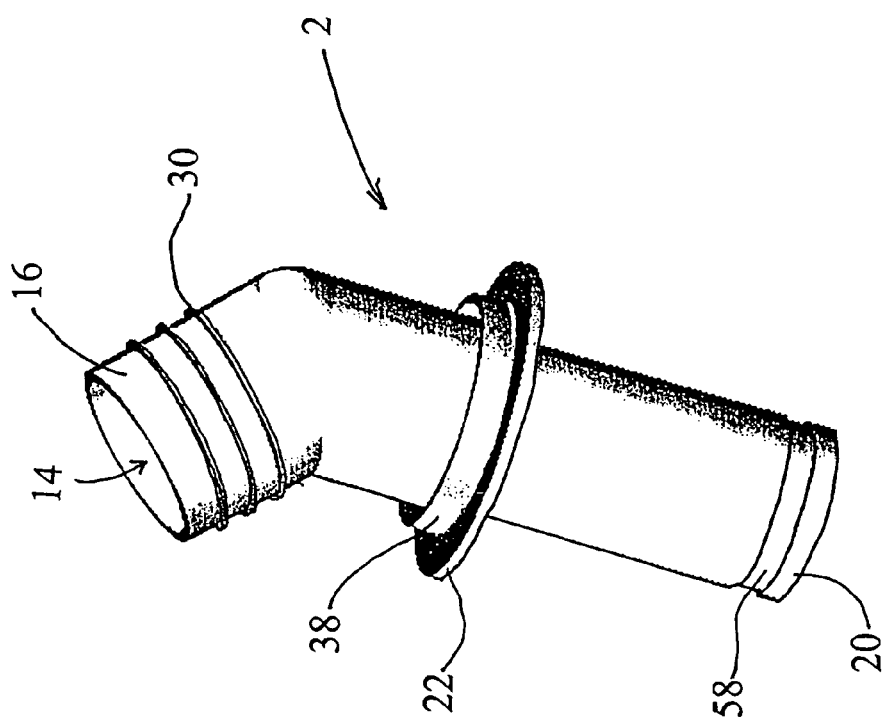
FIG. 12 a diagrammatic perspective view of the main body of the sealing device with the first end angled with respect to a remainder of the coupling device.

According to a further embodiment, as shown in FIG. 12, the opened first end 16 of the coupling device 2 is angled with respect to a remainder of the main body 12. The opened first end 16 of the coupling device 2 can be arranged at a variety of different beneficial angles which all aid in drainage of the waste 6 from the sewage holding tank 8 of the RV 26 via the flexible RV sewer line 24 and the coupling device 2. According to FIG. 12, the opened first end 16 of the coupling device 2 forms a 45 degree angle with the central longitudinal axis A of the main body 12. It is to be appreciated that the angle formed between the opened first end 16 of the coupling device 2 and the central longitudinal axis A of the main body 12 can vary between 0° and 90°, for example, depending upon the particular application.

Figure 13:
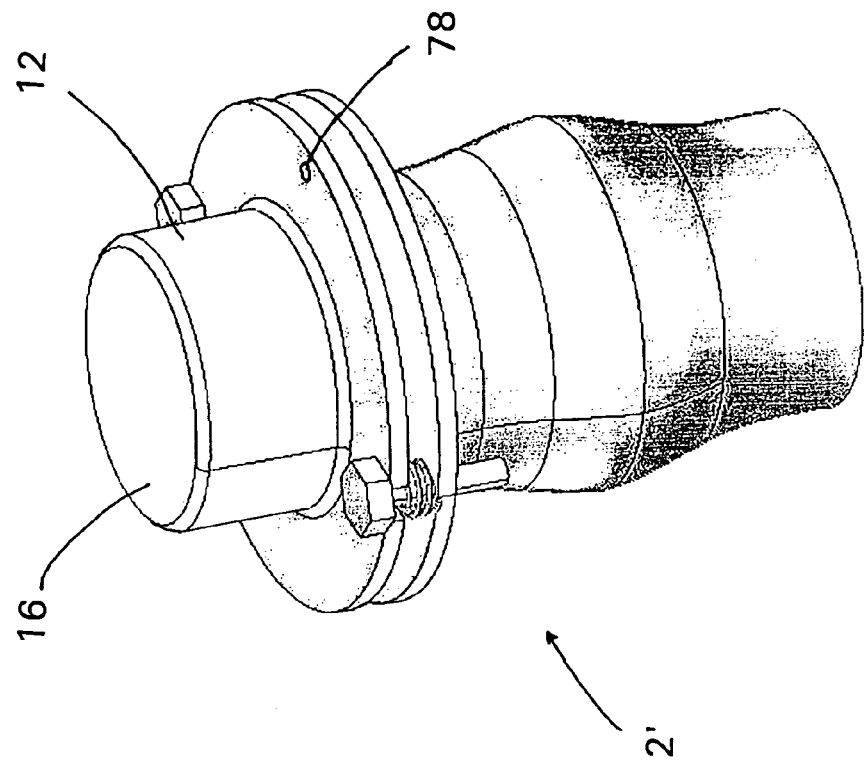
FIG. 13. is a diagrammatic view of the sealing device configured as a cap or cover for a fixed waste pipe.

According to yet another embodiment, the coupling device 2 can be manufactured so as a cap, cover or plug, as shown in FIG. 13. The first main difference for the cover or cap coupling device 2', versus the coupling device 2, is that the main body 12 is not hollow, i.e., either the first and/or the second end is not opening or some portion of the main body is blocked or cover in some manner so as to prevent the passage of any solid, liquid and/or gas therethrough. Secondly, as it is not necessary for the first end 16 of the main body 12 to engage with the leading free end 32 of the flexible RV sewer line 24 or the adaptor 34, i.e., the first end 16 does not have an exterior thread or any other engagement feature. In all other respect, i.e., the insertion and removal of the cap coupling device 2' into and out of the fixed waste pipe 10, is essentially as described above with respect to the coupling device 2.

As shown in FIGS. 4 and 4A, the mid-section or intermediate region 56 of the sealing sleeve 50 may have one or more annular ribs 76 formed therein to provide tighter seal with the inwardly facing surface 51 of the fixed waste pipe 10. The ribs 76 are annular fins or ridges which extend around an outer periphery or circumference of the mid-section or intermediate region 56 or possibly grooves which are formed in the mid-section or intermediate region 56 of the sealing sleeve 50. These ribs 76 provide a plurality of point contact seals with the inwardly facing surface 51 of the fixed waste pipe 10 and also provide a scraping or cleaning action to the inwardly facing surface 51 of the fixed waste pipe 10 as the ribs 76 slid along therealong and thereby improve the ability of the sealing sleeve 50 to form a fluid tight seal between the coupling device 2 and the fixed waste pipe 10.

Use of the coupling device 2 will now be described. A typical RV sewer line 24 extends from the sewage holding tank 8 and is generally flexible to facilitate an easy "hook up" with a fixed waste pipe 10 such as is typically found in RV parks or campgrounds. With a sewer line 24, excessive positioning and repositioning of the RV 26 is not necessary, to enable sewer hook up. The first end 16 of the main body 12 of the coupling device 2 is inserted into and received by either the adaptor 34 or the leading free end 32 of the flexible RV sewer line 24 and rotated, in a clockwise manner, to engage the threaded exterior surface 28 of the main body 12 with the RV sewer line 24. As the main body 12 of the coupling device 2 is rotated, the threads induce further insertion of the main body 12 within the sewer line 24 in a conventional manner. The main body 12 is rotated until the leading end 32 of either the flexible RV sewer line 24 or the leading end of the adaptor 34 is located within the recessed area 40 of the flange 22. This facilitates formation of a further seal to also prevent escape of noxious gases and fumes thereby. The coupling device 2 is now ready for use, e.g., insertion into the fixed waste pipe 10 at an RV park or campground.

In an unbiased state, the sealing sleeve 50, in one embodiment, has a tendency to bias the movable member 42 away from the flange 22 such that the sealing sleeve 50 has the shape shown in FIG. 4, e.g., the sealing sleeve 50 normally has a large diameter or dimension which is generally larger than the interior diameter D1 of the fixed waste pipe 10 of the RV camp. In order to engage the coupling device 2 with the fixed waste pipe 10 and form the fluid tight seal therewith, the operator simply moves or pulls the movable member 42 along the exterior surface 28 of the main body 12, toward the flange 22. Such motion elongates or stretches the sealing sleeve 50 into a substantially cylindrical or tubular shape as shown in FIG. 5. As the movable member 42 is biased toward or even possibly abuts against the flange 22, such biasing motion reduces the exterior diameter or dimension of the sealing sleeve 50 so as to facilitate insertion of the first end 16 of the coupling device 2 into exposed opening of the fixed waste pipe 10 of the RV park or campground.

Once the leading first end 16 of the coupling device 2 is sufficiently inserted into and received by the exposed opening of the fixed waste pipe 10 at a desired position, e.g., the movable member 42 abutting with an upwardly facing edge or surface of the fixed waste pipe, the movable or movable member 42 is released. As soon as the biasing force on the sealing sleeve 50, via the movable member 42, is eliminated, the inherent characteristics of the material from which the sealing sleeve 50 is manufactured, naturally force the movable member 42 away from the flange 22 and allow the sealing sleeve 50 to return back to its normal large diameter state in its diameter is larger than the interior diameter of the fixed waste pipe 10. Such motion may possibly also move the main body 12 vertically away from the fixed waste pipe 10 a small distance. As the diameter of the sealing sleeve 50 increases, the exterior surface of the sealing sleeve 50 eventually engages with the inward facing surface 51 of the fixed waste pipe 10 and thereby forms or creates a fluid tight seal between the coupling device 2 and the fixed waste pipe 10 of the RV park or campground.

Once a suitable seal between the coupling device 2 and the fixed waste pipe 10 is achieved, waste 6 from the sewage holding tank 8 of the RV can be then be disposed of, as required or necessary, in a conventional manner. The seal is preferably a fluid tight seal which prevents any "splash back" of the waste 6 from the sewage holding tank 8 and also minimizes exhaust of any noxious gases or fumes which are conventionally associated with disposal of the waste 6 from the sewage holding tank 8. The coupling device 2 will generally remain install for the entire period of time the RV is located at the camping site. When an operator determines that the RV is to leave the site, the above steps are repeated in the reverse manner to facilitate removal of the coupling device 2 from the fixed waste pipe 10 of the site at the RV park or campground.

When an RV camp site is unoccupied, a user or camp representative will typically ensure that the inlet or opening to the fixed waste pipe 10 is properly capped or covered to block the escape of sewer gases therefrom. To accomplish this, the operator simply moves or pulls the movable member 42, of the cap coupling device 2', along the exterior surface 28 of the main body 12, toward the flange 22. Such motion elongates or stretches the sealing sleeve 50, according to one embodiment, into a substantially cylindrical or tubular shape as shown in FIG. 5. As the movable member 42 is biased toward or even possibly abuts against the flange 22, such biasing motion reduces the exterior diameter of the sealing sleeve 50 so as to facilitate insertion of the first end 16 of the cap coupling device 2 into exposed opening of the fixed waste pipe 10 of the RV park or campground.

Once the leading first end 16 of the coupling device 2 is sufficiently inserted into and received by the exposed opening of the fixed waste pipe 10, the movable or movable member 42 is released. As soon as the biasing force on the sealing sleeve 50, via the movable member 42, is eliminated, the inherent characteristics of the material from which the sealing sleeve 50 is manufactured, naturally force the movable member 42 away from the flange 22 and allow the sealing sleeve 50 to return back to its normal large diameter or dimension state which is larger than the interior diameter D1 of the fixed waste pipe 10. As the diameter or dimension of the sealing sleeve 50 increases, the exterior surface of the sealing sleeve 50 eventually engages with the inward facing surface 51 of the fixed waste pipe 10 and thereby forms or creates a fluid tight seal between the cap coupling device 2' and the fixed waste pipe 10 of the RV park or campground. If desired, the cap coupling device 2' can be provided with a plurality of biasing unit 72, as discussed above, to positively bias the movable member 42 away from the flange 22. The cap coupling device 2' can also be provided with a lanyard aperture 78 for attachment of a lanyard, chain or rope to secure the cap coupling device 2' and prevent loss thereof while the fixed waste pipe is in use.

The main body 12, the flange 22 and the movable member 42 are all preferably manufactured from a rigid durable plastic which is weather resistant and able to withstand repeated exposure to environmental conditions such as rain, snow, sun, cold, heat, etc. A few suitable materials for manufacturing the main body 12, the flange 22 and the movable member 42 would be, for example, from one or more rigid polymeric materials such as PVC or ABS. However, the flange 22 and the movable member 42 could also be manufactured from a metal or a metal alloy such as aluminum, copper, stainless steel or combinations thereof.

The annular channel or groove 44, 58 formed in the collar and the main body 12 typically has a depth of between about $5/16$ inch and about $1/16$ inch and is preferably between about $5/8$ inch and $1/8$ inch wide.

It is important that all of the joints and connections of the coupling device 2 are substantially gas-tight to prevent leakage of any obnoxious gases and fumes thereby.

While the invention has been particularly shown and described with reference to preferred embodiments of the coupling device, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

I claim:

1. A coupling device, for engaging with a waste pipe, comprising:
    a main body having an exterior surface and a first end and an opposed second end, for insertion into an opening of the waste pipe;
    only a single movable member being freely slidable axially along the exterior surface of the main body between the first and the second end of the main body;
    only a single sealing sleeve supported by the main body, a second end of the sealing sleeve being directly affixed to the main body adjacent the second end thereof while a first end of the sealing sleeve being directly connected to the movable member, and the movable member being located between the first end of the main body and the sealing sleeve;
    wherein the sealing sleeve, in a normal unbiased state, has an intermediate section with a transverse dimension which is greater than a transverse dimension of both the first and second ends of the sealing sleeve;
    whereby when the movable member is moved along the main body in a first direction toward the first end of the main body, minimum dimension of the sealing sleeve is achieved to facilitate insertion of the second end of the main body into the waste pipe and, when the movable member is moved in an opposite second direction along the main body toward the second end of the main body, a maximum dimension of the sealing sleeve is achieved to facilitate formation of a seal with an inner surface of the waste pipe.

2. The coupling device according to claim 1, wherein the first end of the main body matingly engages with a remote free end of a sewer line, and the main body, the first end and the second end of the main body are all hollow to facilitate passage of waste through the main body.

3. The coupling device according to claim 1, wherein the main body is closed to prevent passage therethrough so that the coupling device forms a cap for engaging with and sealing the waste pipe.

4. The coupling device according to claim 1, wherein the movable member includes a collar and the first end of the sealing sleeve is secured to the collar.

5. The coupling device according to claim 4, wherein the movable member and the collar both have a throughbore extending therethrough to facilitate sliding movement of the movable member and the collar with respect to the exterior surface of the main body.

6. The coupling device according to claim 1, wherein an annular groove is formed in an exterior surface of the main body adjacent the second end thereof, and the second end at the sealing sleeve is secured to the annular groove by a fastener.

7. The coupling device according to claim 1, wherein the movable member includes a collar and the collar has an annular groove formed in an exterior surface thereof, and the first end of the sealing sleeve is secured to the annular groove by a fastener.

8. The coupling device according to claim 1, wherein a flange is supported by the main body between the first end of the main body and the movable member.

9. The coupling device according to claim 8, wherein the flange supports an annular shoulder which axially projects toward the first end of the main body and the annular shoulder, the flange and the main body together form a recessed area for accommodating a leading portion of the sewer line.

10. The coupling device according to claim 8, wherein the flange is provided with a plurality of notches and the movable member is provided with a plurality of corresponding apertures and a plurality of bolts interconnect the flange with the movable member, and at least one spring is provided for biasing the movable member away from the flange.

11. The coupling device according to claim 1, wherein the first end of the main body forms an angle of between 0 and 90 degrees with respect to a longitudinal axis defined by a remainder of the main body.

12. The coupling device according to claim 1, wherein the exterior surface of the first end of the main body has an external thread which facilitates engagement with a sewer line to facilitate releasable connection of the coupling device to the sewer line.

13. The coupling device according to claim 1, wherein the exterior surface of the first end of the main body has an external thread which facilitates engagement with an internal Thread of an adaptor, connected to a sewer line, to facilitate releasable connection of the coupling device to the sewer line.

14. The coupling device according to claim 1, wherein the main body, the flange and me movable member are all manufactured from one or more of a rigid polymeric material, PVC, ABS, a metal and a metal alloy and the sealing sleeve is manufactured from one or more of rubber and TPE.

15. A coupling device, for engaging with a waste pipe, comprising:
- a main body having a second end for insertion into an opening of the waste pipe and an opposed first end, and the main body having an exterior surface;
- a flange being supported by the main body between the first end and the second end of the main body;
- a single movable member, having a collar, being freely slidable axially along the exterior surface of the main body between the first and the second end of the main body; and
- a single sealing sleeve supported by the main body, a second end of the sealing sleeve being directly affixed to the main body adjacent the second end thereof while a first end of the sealing sleeve being directly connected to the collar of the movable member, and the movable member being located between the first end of the main body and the sealing sleeve;
- wherein an exterior diameter of an intermediate region of the sealing sleeve, in a relaxed unbiased state, is greater than an exterior diameter of the first end of the sealing sleeve and an exterior diameter of the second end of the sealing sleeve;
- whereby when the movable member is moved along the main body in a first direction toward the first end of the main body, a minimum dimension of the sealing sleeve is achieved to facilitate insertion of the second end of the main body into the waste pipe and, when the movable member is moved in an opposite second direction along the main body toward the second end of the main body, a maximum dimension of the sealing sleeve is achieved to facilitate formation of a seal with an inner surface of the waste pipe.

16. The coupling device according to claim 15, wherein the first end of the main body matingly engages with a remote free end of a sewer line, and the main body, the first end and the second end of the main body are all hollow to facilitate passage of waste through the main body.

17. The coupling device according to claim 15, wherein the main body is closed to prevent passage therethrough so that the coupling device forms a cap for engaging with and sealing the waste pipe.

18. A method of engaging a coupling device to a waste pipe, the method comprising the steps of:
- forming a main body with a second end which is sized for insertion into an opening of the waste pipe and the main body having an opposed first end and an exterior surface;
- only providing the main body with a single movable member which is freely slidable axially along the exterior surface of the main body between the first and the second end of the main body;
- only supporting a single sealing sleeve on the main body with the sealing sleeve, in a normal unbiased state, having an intermediate section with a transverse dimension which is greater than a transverse dimension of both a first end thereof and a second end thereof;
- directly affixing a second end of the sealing sleeve to the main body, adjacent the second end thereof, and directly affixing a first end of the sealing sleeve to the movable member with the movable member being located between the first end of the main body end the sealing sleeve; and
- moving the movable member along the main body in a first direction toward the first end of the main body, to minimize a dimension of the sealing sleeve and facilitate insertion of the second end of the main body into the waste pipe; end
- moving the movable member in an opposite second direction along the main body toward the second end of the main body so as maximize the dimension of the sealing sleeve and facilitate formation of a seal with an inner surface of the waste pipe.

19. The method according to claim 18, further comprising the step of forming the main body to be one of hollow and facilitate passage of waste through the main body and dosed so as to prevent passage of waste therethrough.

* * * * *